Dec. 2, 1952     C. D. KELLER     2,620,007
AUTOMOBILE COVER
Filed Jan. 10, 1950
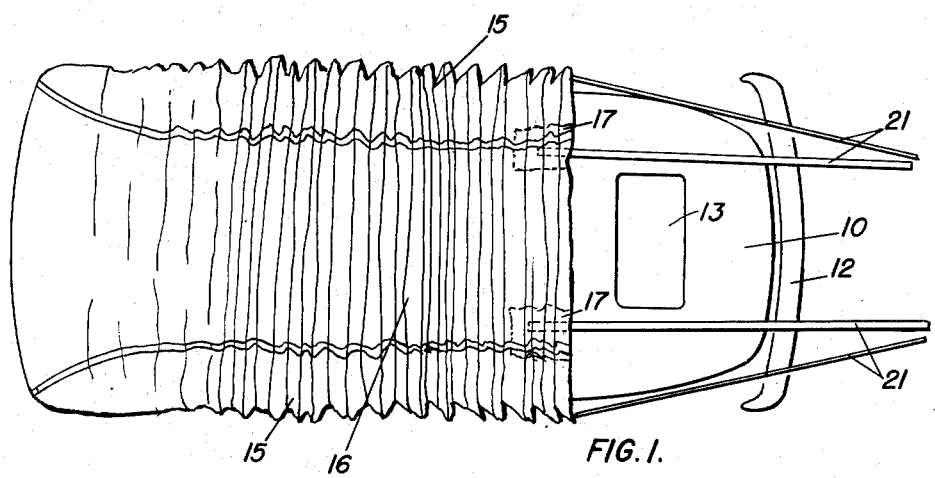
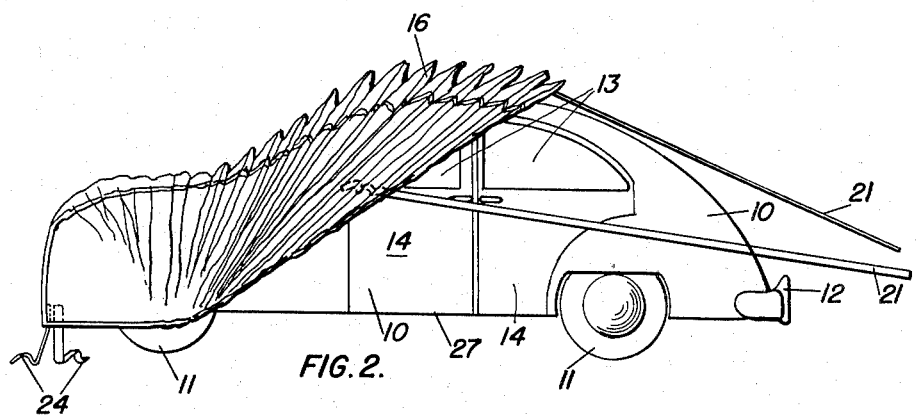
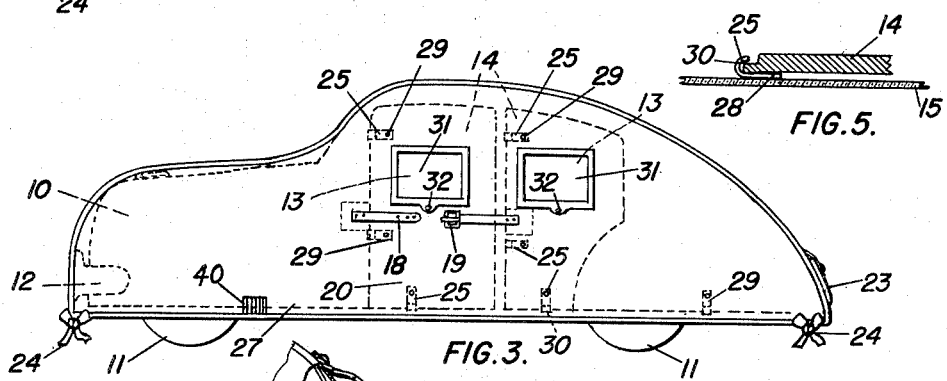
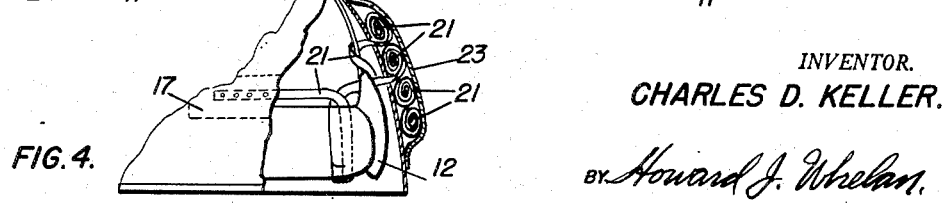
INVENTOR.
CHARLES D. KELLER.
BY Howard J. Whelan,
ATTORNEY.

Patented Dec. 2, 1952

2,620,007

UNITED STATES PATENT OFFICE 2,620,007

AUTOMOBILE COVER

Charles D. Keller, Baltimore, Md.

Application January 10, 1950, Serial No. 137,821

1 Claim. (Cl. 150—52)

This invention relates to coverings and particularly those for protecting vehicles and their contents especially including automobiles.

While tarpaulins and similar sheetings are occasionally used for covering vehicles of various descriptions, they are commonly applied in a relatively rough manner, without much regard as to whether they cover neatly or not. They accomplish their purposes in a general way, but by reason of the lack of proper fitting are subject to dismantling by the wind or removal by unauthorized persons, while the parts not fully covered become injured or spoiled by dust or other effects of the elements. In this invention provision is made to fully cover the vehicle on which it is used, and particularly an automobile, so it will be effectively fitted with a sheeting and at the same time permit inspection through its material.

It is therefore an object of this invention to provide a new and improved vehicle covering that will avoid one or more of the disadvantages and limitations of the prior art.

Another object of the invention is to provide a new and improved vehicle covering that will fit closely and permit inspection through it to observe the condition of the vehicle covered.

An additional object of the herein described invention is to provide a new and improved automobile vehicle covering that will enable the automobile to be parked or stored outside and yet withstand the elements successfully.

A further object of the invention is to provide a new and improved automobile covering which will have means for facilitating its placement on the vehicle.

Other objects will become apparent as the invention is more fully described.

For a better understanding of the invention, and the objects thereof reference is made to the accompanying drawings. These drawings in conjunction with the following description outline a particular form of the invention by way of example, while the claims emphasize the scope thereof.

In the drawings:

Figure 1 is a plan view of an automobile partially covered by an automobile cover embodying this invention;

Figure 2 is a side elevation of Figure 1;

Figure 3 is a side view in elevation similar to Figure 2, except that it shows the cover completely positioned on the automobile;

Figure 4 is an enlarged section taken through the pocket to show the manner of storing the straps when the cover is positioned on the automobile; and Figure 5 is a typical section through the cover at the door to show the method of attaching the cover to the door.

Similar reference characters relate to the same parts in all the figures.

In the drawings, an automobile outline 10, is of conventional and present day design, having a body, fenders, wheels 11, and bumpers 12. The windows 13 and doors 14 are shown dotted in a common location and will be referred to, to indicate the manner in which the covering used is to be applied.

The covering consists preferably of plastic sheeting of any suitable class, thick enough to stand hard usage and pulling stresses, and transparent and made into an envelope. Some of the plastics deemed suitable are those of the vinyl cellulose, acetate, casein, phenol-formaldehyde, pyroxylin classes and others generally known. The covering is made with right and left walls 15, having elastic inserts 40 therein, with a panel 16 fastened to them to form the top and front and rear end portions at the seams. The sewing mentioned is intended to cover in a broad sense, sewing, cementing, plastic welding, or otherwise attaching a reinforcing strip 17 at each of the joining edges or seams of the material formed into the covering. The covering conforms with the contour of the automobile and is intended to fit closely. Since there are apt to be variations in the design and contour of the vehicle, provision is made by means of the belts 18 and buckles 19 to tighten up at the sections 20 in between them. The sections can be pulled together to suit the variations in length or width and bring the covering on tightly. Elastic inserts 40 are placed on each side of the envelope to provide a better fit.

To facilitate the placement of the covering over the vehicle, several long straps 21 are attached to the reinforced rim 22 of the covering. They are extended over the automobile beyond the covering as the latter is half put on, and then used to pull the covering over the rest of the way, evenly and conveniently. It will be noted that the straps are secured inwardly of the envelope near the rear end thereof and that they extend rearwardly from their point of attachment completely covered by the envelope when the latter is in place in the vehicle except for their loose ends. The straps 21 are folded up as the covering extends and then placed in a pocket 23 at the rear portion of the covering arranged to receive and protect them. Strings, cords or ribbons 24 are attached to the front and rear of the covering to enable these portions to be fastened to the bumpers 12 and prevent the covering from slipping up. In addition hinged clamps 25 preferably of stainless steel are attached suitably to the covering material and employed to grip the edge of the doors 14 of the vehicle and under the trim 27 at the bottom line of the body. The clamps 25 include a base 28 attachable to the covering material by rivets 29 and a hinged tongue 30 that resiliently clips itself into an angular position when bent through a predetermined angle. The covering is supplied with windows 31 flexibly hinged thereto so they may be raised to provide access under the covering to the clamps and doors for detaching or fastening same. These windows 31 are locked closed by fasteners or buttons 32. The removal of the covering is accomplished by unlocking the clamps and strings, and pulling the covering over the vehicle from the end with the straps. The straps can be employed to assist in the removal of the covering.

In referring to seams it is intended to include various well known methods of fastening pieces of the material together such as stitching, sewing, taping over, applying adhesives and riveting, as long as the connection is water tight and affords a reinforcement.

It is appreciated that the cover or envelope could be installed on the vehicle by mounting it on laterally. The operator would pull on the clamps to start it over the center, then allow gravity to complete the operation. The envelope is preferably longer than the vehicle body so that it will cover it adequately, leaving just the lower portions of the wheels exposed.

While but one general form of the invention is shown in the drawings and described in the specifications, it is not desired to limit this application for patent to this particular form, as it is appreciated that other forms of construction could be made that would use the same principles and come within the scope of the appended claim.

Having thus described the invention, what is claimed is:

A vehicle covering of the class described, comprising an envelope of flexible material contoured to fit over a vehicle on all sides except the bottom, a plurality of straps fastened to inside portions of said envelope in parallel relation to one another but spaced apart and long enough to allow them to be held by an operator pulling the envelope across the vehicle primarily placed thereon at one end thereof, said straps extending between the envelope and the vehicle from a point near the inner rear end thereof to a point outside the outer end of the envelope, means on the envelope for attaching it to predetermined parts of the vehicle to keep the envelope securely on the vehicle, a pocket on said envelope and exteriorly thereof for storing the loose ends of said straps when not in use, the envelope being transparent to permit the inspection of the vehicle through said envelope when in place thereon.

CHARLES D. KELLER.

REFERENCES CITED

The following references are of record in the file of this patent:

UNITED STATES PATENTS

| Number | Name | Date |
|---|---|---|
| 1,559,458 | Rizianu | Oct. 27, 1925 |
| 1,584,518 | Drake | May 11, 1926 |
| 1,715,286 | Hardy | May 28, 1929 |
| 1,728,437 | Mott | Sept. 17, 1929 |
| 1,918,423 | Persinger | July 18, 1933 |
| 2,048,461 | Mosgoffian | July 21, 1936 |
| 2,243,981 | Rowan | June 3, 1941 |
| 2,248,655 | Bila | July 8, 1941 |
| 2,279,812 | Bartlett | Apr. 14, 1942 |